United States Patent Office.

NORMAN CUTTER, OF CINCINNATI, OHIO, AND ELLIOT SAVAGE, OF WEST MERIDEN, CONNECTICUT.

Letters Patent No. 95,568, dated October 5, 1869.

IMPROVEMENT IN THE MANUFACTURE OF IRON AND STEEL.

The Schedule referred to in these Letters Patent and making part of the same.

*To all whom it may concern:*

Be it known that we, NORMAN CUTTER, of Cincinnati, in the county of Hamilton, and State of Ohio, and ELLIOT SAVAGE, of West Meriden, in the county of New Haven, and State of Connecticut, have invented a new and useful Improvement in the Manufacture of Iron and Steel.

Our invention consists in the production, manufacture, and use of a new and useful alloy for deoxidizing, purifying, and improving iron and steel; and we do hereby declare the following to be a full, clear, and exact description of the same.

In the manufacture of the aforesaid alloy, we use the following materials or substances in different proportions:

White or gray cast-iron, in the pig or otherwise, or wrought-iron, with the oxides of manganese, and the cyanide of potassium, the ferro-cyanide of potassium, or other fusible compound containing cyanogen, combined with one or more metals, together with one or more of the compounds of sodium or potassium, as the carbonate of soda, the biborate of soda, or the carbonate of potassa, and charcoal, or other carbonaceous substances.

If we wish to make a given quantity, say thirty-five pounds of the aforesaid alloy, we take, by preference, thirty pounds of gray cast-iron, twenty pounds of powdered anhydrous peroxide of manganese, one pound of cyanide of potassium, one pound of biborate of soda, and about one-sixteenth part of a bushel of crushed charcoal. We mix these materials well together, and place them in a suitable crucible or vessel of sufficient capacity to contain them, covering the mass with a layer of about two inches of crushed charcoal, or luting up the vessel with a suitable cover to protect the contents from the oxygen of the air, or we put them into a suitable furnace without crucibles. This crucible is then placed in a suitable heating-furnace, and subjected to a high degree of heat for a period of three or four hours.

The molten mass is then poured into suitable moulds of iron or moulding-sand, and allowed to cool, the slag or cinder separating from the alloy while pouring and cooling.

We do not wish to confine ourselves to the reducing-agents, or the exact proportions named in the above formulæ, as different proportions may be used, and the other above-mentioned compounds of cyanogen, potassium, and sodium may be used in like proportions.

We find that the reducing-agents, potassium, sodium, and the compounds of cyanogen, render a most necessary and important service in the rapid and perfect reduction of the whole mass as placed in the crucible or furnace, greatly economizing the time of reduction, and increasing the yield and quality of the product or alloy, as well as being powerful agents, together with the manganese, for the purification of the iron and steel upon which they act.

This alloy, when thus made, contains about twenty-five or thirty per cent. of metallic manganese, which, with the potassium and sodium, makes it especially adapted for deoxidizing and purifying the iron in the "Bessemer" converting-vessel, or any other iron and steel which has been oxidized by the action of air passing over it, or having been blown through it while in a fused or molten state, and which may contain impurities, such as sulphur, phosphorus, and silicon.

When this alloy is used for the "Bessemer" metal, a quantity is taken equal to about one and a half per cent. of the whole mass to be acted upon. This quantity is melted with the same or a greater quantity of gray or white iron, according to the grade of metal for hardness or softness desired, and introduced into the vessel containing the charge of iron immediately after the blowing has been completed. The reaction at once takes place, when the whole charge is poured into the ladle, and then drawn off into the ingot-moulds.

The above method of introducing this alloy may be varied.

It may be used alone, without melting it with iron, in which case we bring it to about a red heat, and throw the proper quantity, broken into small pieces, into the converting-vessel immediately after the "blow," giving it a little more time for the reaction to take place, or it may be introduced into the molten mass in any other convenient way.

It is well known that in the "Bessemer" process, after the carbon has been burned out of the iron by the action of the air passing over or having been blown through it, the oxygen of the air, as long as the blowing continues, seizes on the iron, and oxidizes or burns it, leaving the product so redshort that it will not roll or hammer into plates or bars.

To remedy this evil, and save the great loss on the product resulting from redshortness, *spiegel eisen* is used to deoxidize and recarbonize the molten iron. But *spiegel eisen* does not effectually accomplish these objects, because it rarely contains ten per cent. of metallic manganese, on which we depend for the perfect deoxidizing of the iron, while the carbon it contains always equals or exceeds four per cent., which is relied on for recarbonizing the metal.

These two agents being combined in the same substance, viz, *spiegel eisen*, must be used together, and if an increase of quantity is used, in order to obtain a sufficient percentage of manganese to fully deoxidize the metal, the per cent. of carbon is necessarily increased to so great a quantity as to render the product of too high a grade of steel, and so hard and brittle as to be unsuitable for rails, axles, and plates, for which a soft malleable steel is required.

When our alloy is used for the same purpose, this difficulty is avoided.

The alloy contains about twenty-five or thirty per cent. of manganese, or three times as much as *spiegel eisen*, which completely removes the oxidation and redshortness of the metal, and, when melted with such cast-iron as contains a greater or less quantity of carbon, it will be seen that we can supply the exact quantity of carbon necessary to produce either a hard or soft steel, as may be desired.

This alloy may be used with great benefit in the refining and puddling-furnaces, for the purification and improvement of iron or steel. In the puddling-furnace, we prefer to use it after the charge begins to "boil," and before it reaches the most active boiling-stage, but it may be used with advantage at any stage after the charge is well melted, and before the "balling up." The quantity of the alloy which we use for this purpose is from one-fourth of one per cent. to three per cent. of the quantity of metal to be acted upon.

This alloy may also be used for the purification and improvement of crucible steel or "homogeneous metal," in which case it is put into the crucible at the time of charging, at the rate of one-fifth to three per cent. of the amount of the charge.

What we claim as our invention, and desire to secure by Letters Patent, is—

1. An alloy of iron, manganese, and potassium or sodium, or both of the latter, substantially as herein described.

2. The manufacture of such an alloy as we have described from iron, the oxides of manganese, fusible compounds containing cyanogen, combined with one or more metals, and one or more compounds of sodium or potassium, substantially in the manner herein set forth.

3. Deoxidizing, purifying, and improving iron or steel, by treating it in a molten state, substantially as specified, with an alloy such as herein described.

NORMAN CUTTER.
ELLIOT SAVAGE.

Witnesses:
FREDK. HAYNES,
HENRY T. BROWN.